United States Patent [19]

Watanabe

[11] Patent Number: 5,487,629
[45] Date of Patent: Jan. 30, 1996

[54] COOLING AND DUST COLLECTING APPARATUS FOR MACHINE TOOL

[75] Inventor: Fumio Watanabe, Utsunomiya, Japan

[73] Assignee: Fuji Jukogyo Kabushiki Kaisha, Tokyo, Japan

[21] Appl. No.: 321,856

[22] Filed: Oct. 14, 1994

[30] Foreign Application Priority Data

Dec. 1, 1993 [JP] Japan .................................. 5-301765

[51] Int. Cl.⁶ .............................. B23C 9/00; B23Q 11/00
[52] U.S. Cl. ......................... 409/137; 409/136; 451/456
[58] Field of Search .................................. 409/137, 136, 409/135; 408/241.6, 67; 451/456

[56] References Cited

U.S. PATENT DOCUMENTS

| | | | |
|---|---|---|---|
| 4,011,792 | 3/1977 | Davis | 409/137 |
| 4,037,982 | 7/1977 | Clement | 451/456 X |
| 4,778,315 | 10/1988 | Duffy et al. | 409/136 |
| 4,915,550 | 4/1990 | Arai et al. | 409/137 |
| 4,946,322 | 8/1990 | Colligan | 409/137 |
| 4,986,703 | 1/1991 | Hampl et al. | 409/137 |
| 5,245,152 | 9/1993 | McCall | 409/137 |
| 5,332,343 | 7/1994 | Watanabe | 409/136 |

FOREIGN PATENT DOCUMENTS 4646  1/1986  Japan ...................................... 409/137

Primary Examiner—William Briggs
Attorney, Agent, or Firm—Beveridge, DeGrandi, Weilacher & Young

[57] ABSTRACT

A cutting and dust collecting housing which encloses a cutter main shaft and a cutter forms a closed space where cutting, cooling and chip collecting are performed. The pressurized cold air introduced into the housing, partly is blown from first cold air outlet holes to make an air curtain around the cutter, and partly is blown from second cold air outlet holes to cool the cutter and at the same time to strip cutting chips off the cutter. The cutting chips are floated in the housing and then discharged therefrom by a vacuum type cutting chip sucking device.

20 Claims, 15 Drawing Sheets

COOLING AND DUST COLLECTING APPARATUS FOR MACHINE TOOL

BACKGROUND OF THE INVENTION

1. Technical Field

The present invention relates to a cooling and dust collecting apparatus of a machine tool for cooling a cutter and discharging cutting chips.

2. Related Art

There have been proposed various types of cooling and dust collecting apparatuses for machine tools. For example, Japanese Patent Laid-Open Publication No. Toku-Kai-Sho 58-59746 discloses a cooling and dust collecting apparatus for a machine tool in which a drill is surrounded by a hood and the drill is cooled by spraying a mist of a cutting oil towards the center of the drill in several directions.

Further, Japanese Patent Laid- Open Publication Nos. Toku-Kai-Sho 63-300807 and Toku-Kai-Hei 3-3713 disclose a pressure foot for printed circuit board drilling machines. The pressure foot is connected to a cutting chip sucking device through a hose so as to keep the inside of the pressure foot in the negative pressure state. Additionally, compressed air is horizontally blown from the vicinity of the front end of the pressure foot in the tangent direction of the drill. The compressed air expands in the pressure foot almost in an adiabatic state, thereby the temperature there-in sharply lowering. The compressed air thus cooled down cools the drill of the drilling machine and is discharged to the cutting chip sucking device together with cutting chips.

However, in the abovementioned cooling and dust collecting apparatuses for machine tools, since cutting oil mist or compressed air is blown to a cutter in nearly horizontal direction, a portion of the cutter exposed out of a workpiece is cooled, whereas portion hidden therein is not cooled. In addition, cutting chips which are caught in a hole or groove are not discharged.

The applicant of the present invention has disclosed a cooling and dust collecting apparatus for machine tools in Japan Patent Laid-Open Publication No. Toku-Gan-Hei 4-210464 so as to solve the problems as described above. The cooling and dust collecting apparatus disclosed therein comprises a cooling and dust collecting housing installed at the lower end of the spindle housing in such a way as enclosing a main shaft and a cutter of the machine tool, a plurality of cold air passages which are built in the cooling and dust collecting housing and communicate a cold air intake portion connected to an external compressed cold air supplying device with a first and second cold air outlet portions, a cutting chip discharging passage which is built in the cooling and dust collecting housing and communicates a discharge port connected to an external cutting chip sucking device with an internal space of the cooling and dust collecting housing, an elastic hood having slits at the foot thereof and suspended from the bottom edge of the cooling and dust collecting housing. The first cold air outlet portion injects the compressed cold air towards the shaft of the cutter and the second cold air outlet portion injects the compressed cold air in the diagonally downward direction and in the tangent direction of the outer periphery of the cutter edge so as to detach cutting chips from the cutter or to float cutting chips away from holes and grooves. These cutting chips are sucked and discharged outside by the external cutting chip sucking device. The elastic food acts as preventing the compressed cold air injected to the cutter and cutting chips from flowing out of the cooling and dust collecting housing.

However, in the cooling and dust collecting apparatus for a machine tool according to the patent No. Toku-Gan-Hei 4-210464, there is the defect that the discharging of cutting chips and the cooling of the cutter can not be performed satisfactorily depending upon the cutting conditions, since the flow-out of the compressed cold air and the cutting chips is prevented only by the elastic hood.

SUMMARY OF THE INVENTION

It is an object of the present invention to provide a cooling and dust collecting apparatus for a machine tool which is capable of cooling a portion hidden in a workpiece as well as a portion exposed therefrom and capable of more surely discharging cutting chips in holes or grooves of a workpiece.

Disclosed is an apparatus comprising:

a housing fixed to the machine tool for enclosing a spindle and a cutter of the machine tool;

an elastic hood suspended from the bottom end of the housing for ensuring an enclosure of the housing;

cold air supplying means for supplying a pressurized cold air;

a first cold air intake attachment mounted on the housing for introducing pressurized cold air from the cold air supplying means into the housing;

a second cold air intake attachment mounted on the housing for introducing pressurized cold air from the cold air supplying means into the housing;

a plurality of first cold air outlet holes provided at equal spaces on the bottom surface of the housing so as to form an air curtain around the cutter with pressurized cold air blown vertically from the fist cold air outlet holes;

a plurality of second cold air outlet holes provided in a ring attachment detachably connected to the bottom of the housing so as to cool the cutter with pressurized cold air blown diagonally and downwardly from the second cold air outlet holes;

first cold air passage means provided in the housing for communicating the first cold air intake attachment and the first cold air outlet holes;

second cold air passage means provided in the housing for communicating the second cold air intake attachment and the ring attachment;

a cold air discharging attachment mounted on the housing for discharging cutting chips from inside of the housing together with the pressurized cold air; and cutting chip sucking means communicated with the cold air discharging attachment for sucking and collecting cutting chips.

In the cooling and dust collecting apparatus thus constituted, the cold air for cooling the cutter which is blown from the cold air outlet hits the cutter edge in the diagonally downward direction and in the tangent direction of the cutter edge to cool the heated cutter edge and to discharge the cutting chips out of holes or grooves of a workpiece by raising a dust of cutting chips.

The cold air for the air curtain is introduced from the air intake port for air curtain and an air curtain is formed by blowing the cold air downward from the air outlet hole after passing through the cold air passage for air curtain which is built in the cooling and dust collecting housing. The air curtain thus formed shuts the surrounding of the cutter off from the cooling and dust collecting housing, thereby preventing cutting chips from being scattered around. Thus the cutting chips are discharged outside together with air from the cutting chip discharging port.

BRIEF DESCRIPTION OF THE DRAWINGS

FIG. 5 (b) is a vertical sectional view of a mounting member;

FIG. 6 (b) is a bottom view of an upper housing;

FIG. 7 (b) is a plan view of an inner housing;

FIG. 8 (b) is a partial sectional view of an inner housing;

FIG. 10 (b) is a partial sectional view of a lower housing;

FIG. 13 (b) is a plan view of a cold air delivery ring;

FIG. 16 (b) is a side view of a cold air distributor for the cutter;

FIG. 17 (b) is a side view of a bracket constituting a cold air intake attachment for the cutter;

FIG. 18 (b) is a top view of another bracket constituting a cold air intake attachment for the cutter;

DETAILED DESCRIPTION OF PREFERRED EMBODIMENTS

Referring to FIGS. 1 to 23, a cooling and dust collecting apparatus for machine tool according to an embodiment of the present invention will be described hereinafter.

Figure 1:
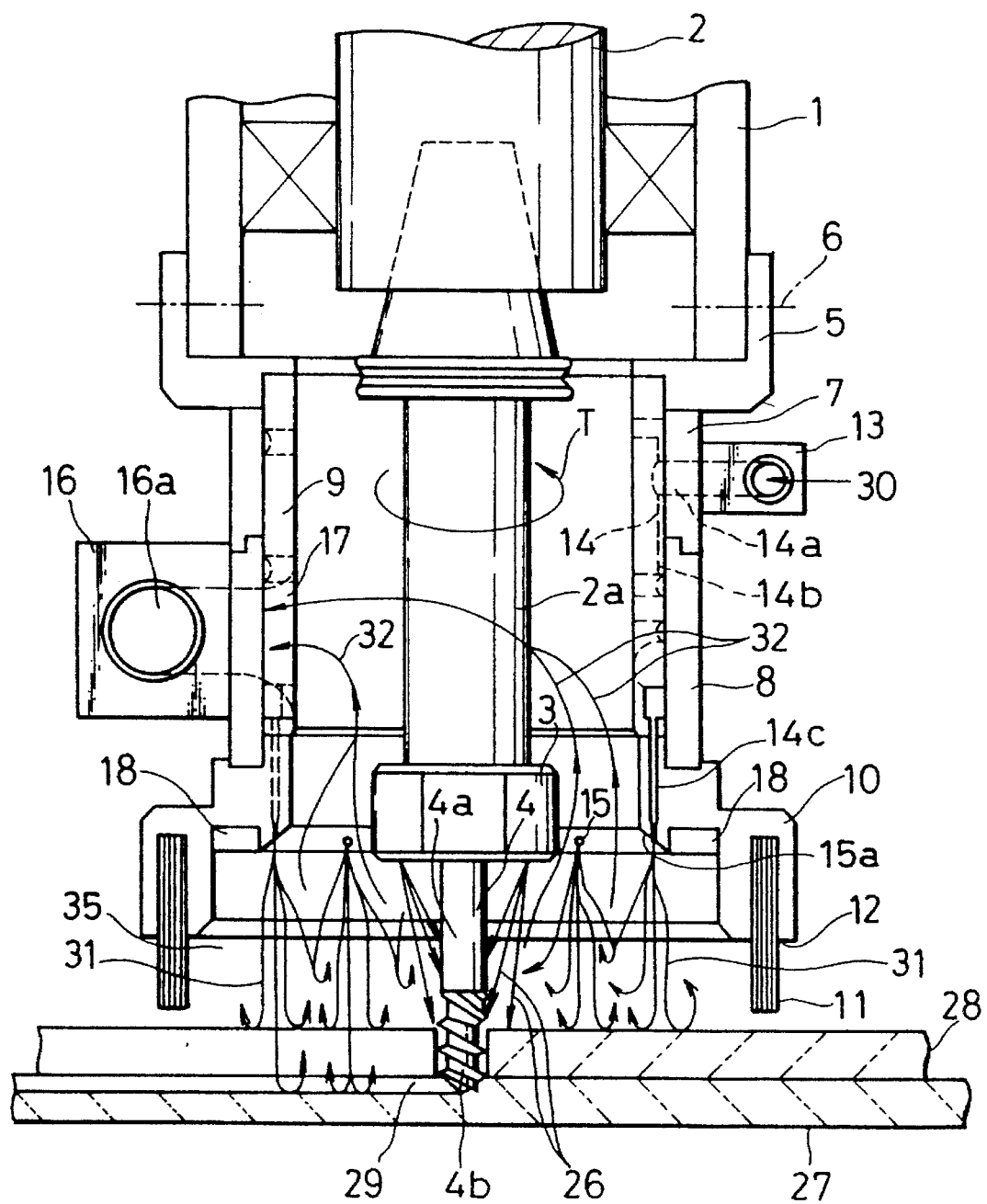
FIG. 1 is a vertical sectional view schematically showing a cooling and dust collecting apparatus for a machine tool according to an embodiment of the present invention.
Figure 2:
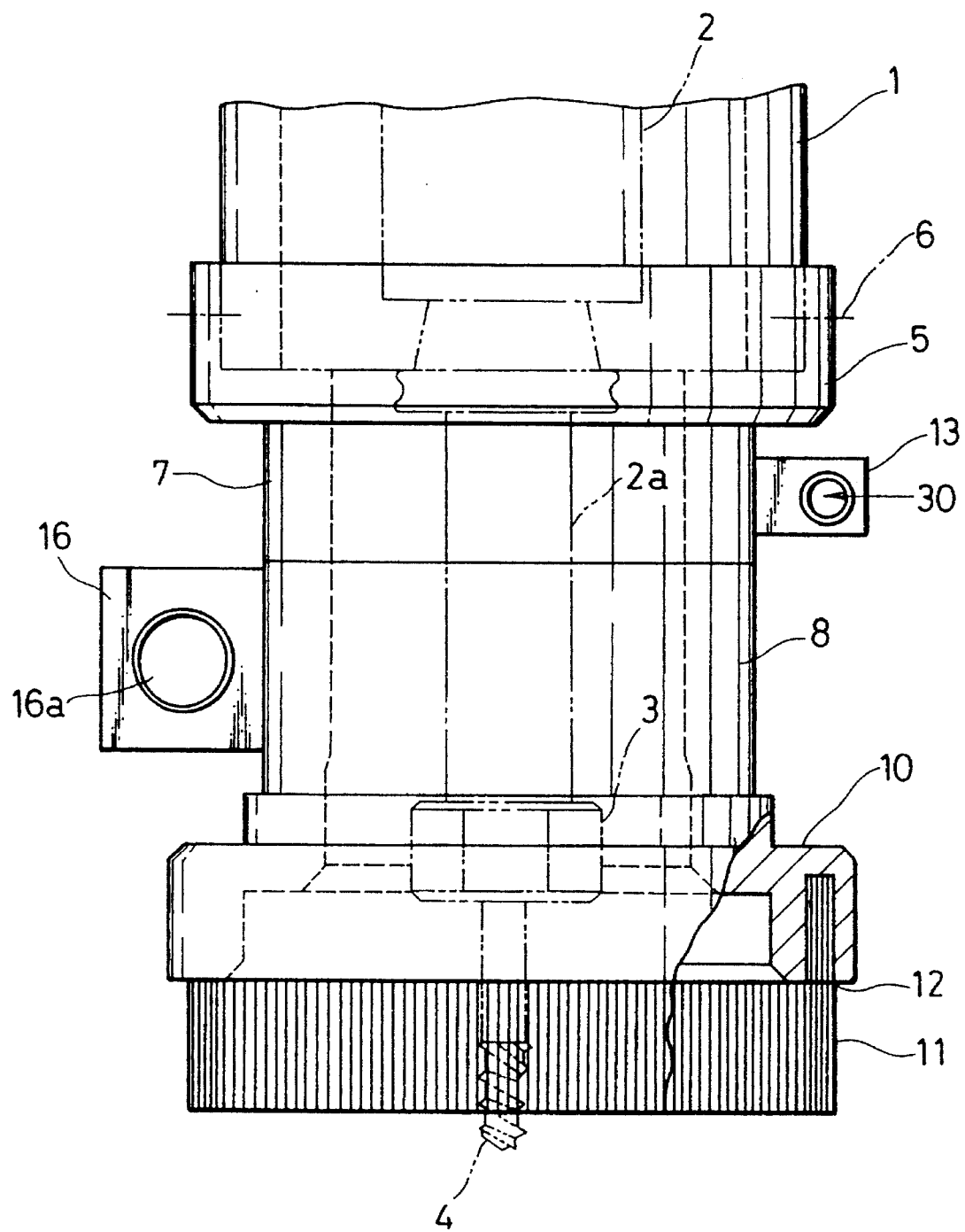
FIG. 2 is a partial sectional view of FIG. 1.
Figure 7A:
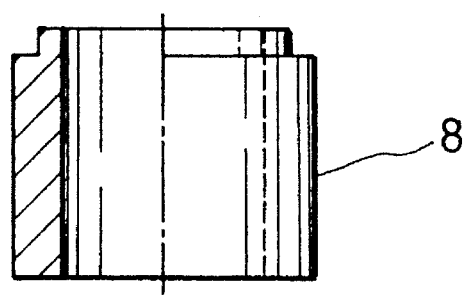
FIG. 7 (a) is a partial sectional view of an intermediate housing.
Figure 7B:
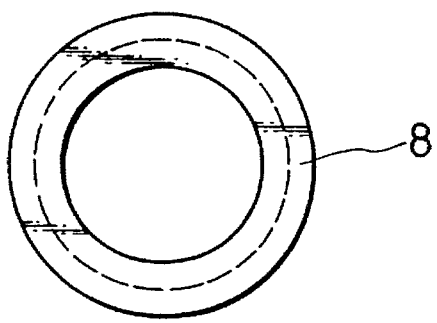
Figure 8A:
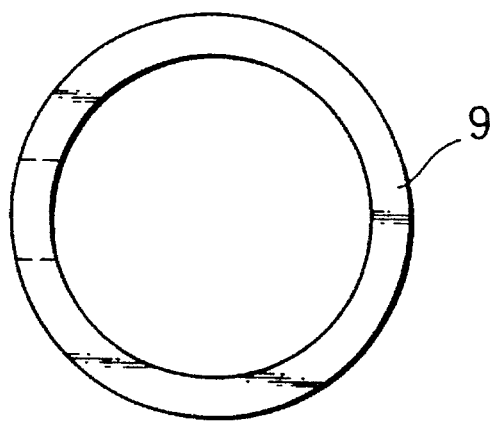
FIG. 8 (a) is a plan view of an inner housing.
Figure 8B:
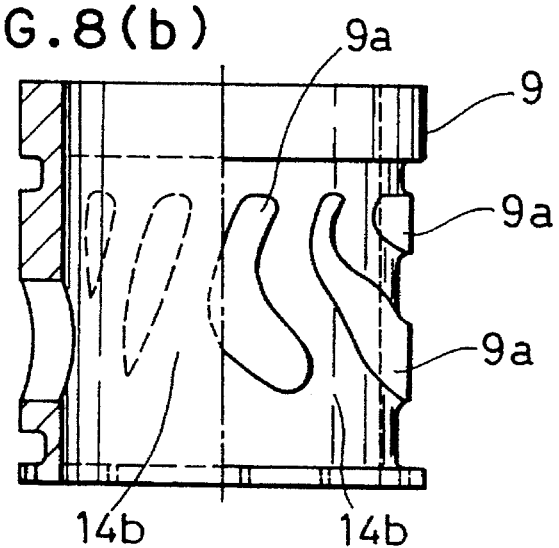
Figure 9:
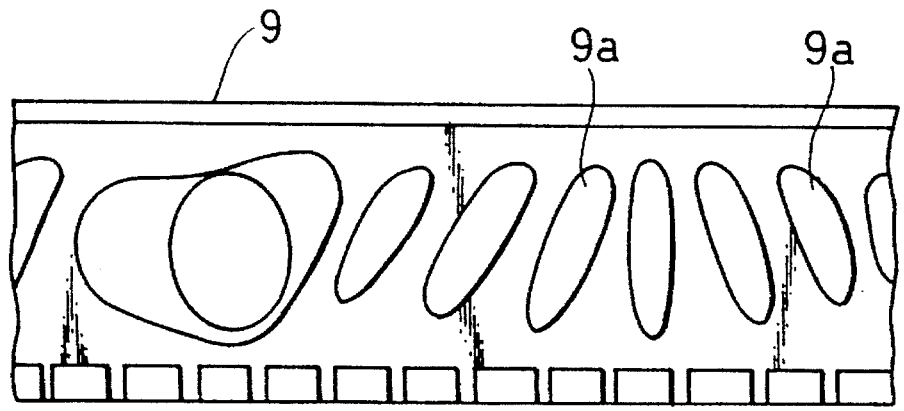
FIG. 9 is a developmental view of an inner housing.

As shown in FIGS. 1 and 2, in a cutting and drilling machine such as a NC rooter, cutter main shaft 2a is connected to spindle 2. Cutter 4 is fixed to cutter main shaft 2a through collet chuck 3. Mounting member 5 is connected to spindle housing 1 through bolt 6. The detailed configuration of mounting member 5 is shown in FIG. Further, upper housing 7 is fixed to mounting member 5. As for the configuration of upper housing 7, refer to FIG. 6. Upper housing 7 is connected to intermediate housing 8 whose configuration is illustrated in FIG. 7. Inner housing 9 is mounted inside of upper housing 7 and intermediate housing 8. The detailed configuration of inner housing 9 is shown in FIG. 8 and FIG. 9.

Figure 10A:
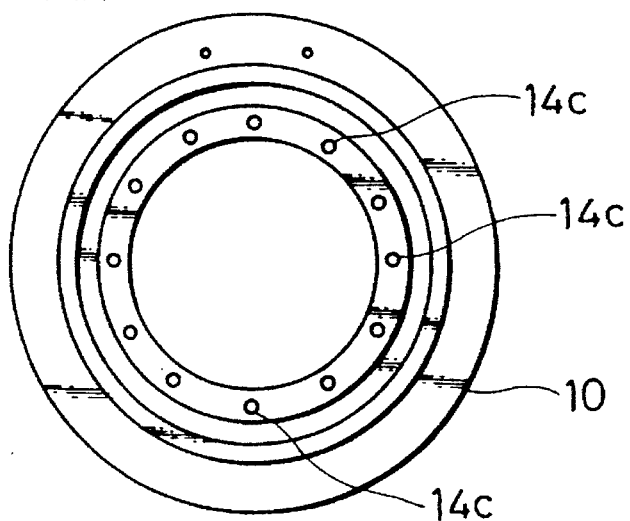
FIG. 10 (a) is a plan view of a lower housing.
Figure 10B:
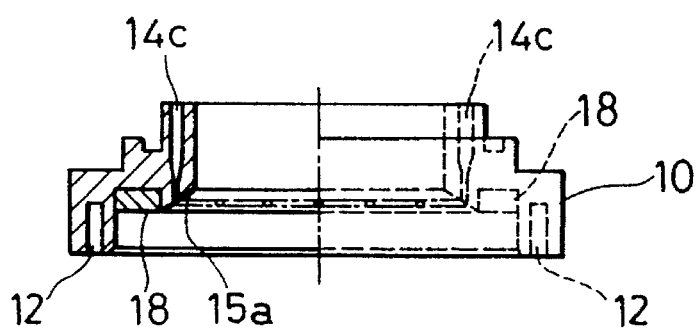
Figure 11:
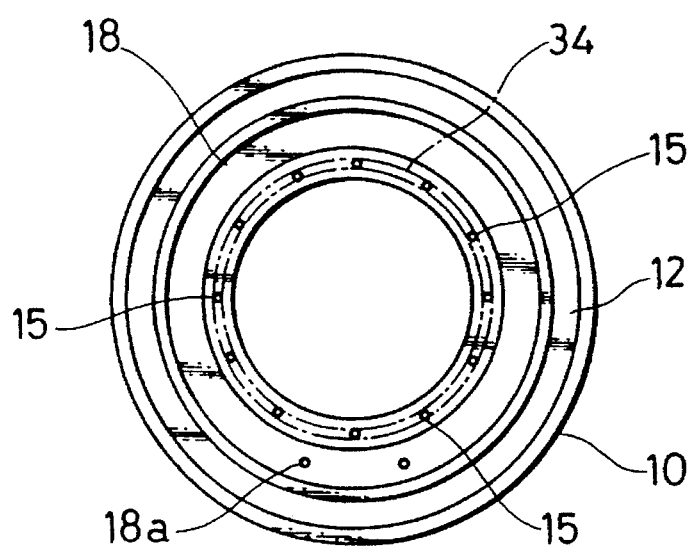
FIG. 11 is a bottom view of a lower housing.

Furthermore, intermediate housing 8 is fixed to lower housing 10 from which elastic hood 11 is suspended. Elastic hood 11 is fitted in groove 12 engraved at the bottom of lower housing 10. The detailed configuration of lower housing 10 is shown in FIG. 10 and FIG. 11.

That is to say, the cooling and dust collecting housing comprises mounting member 5, upper housing 7, intermediate housing 8, inner housing 9 and lower housing 10. The overall body of the cooling and dust collecting housing is fixed to spindle housing 1 of the machine tool.

Figure 12:
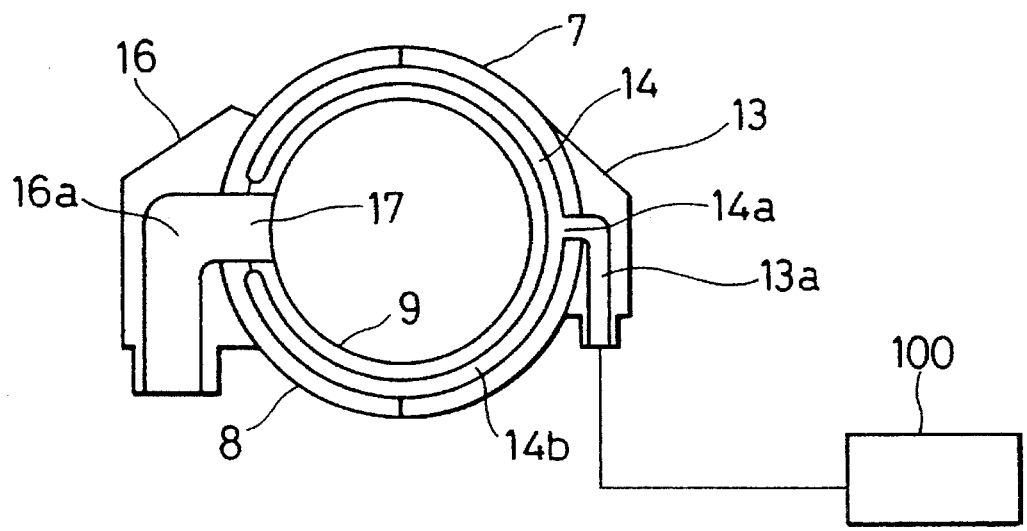
FIG. 12 is a schematic view showing a cold air intake attachment for the air curtain and a dust collecting attachment.

Cold air intake attachment 13 for air curtain is mounted on upper housing 7. As shown in FIG. 12, cold air intake attachment 13 has through hole 13a whose one end is connected to pressurized cold air supplying apparatus 100 located away from the cooling and dust collecting housing. The other end of through hole 13a is connected to cold air passage for air curtain which is communicated to the inside of the cooling and dust collecting housing wall. This cold air passage 14 for air curtain, as shown in FIG. 1, comprises passage 14a provided in upper housing 7, passage 14b which is provided in the space formed between intermediate housing 8 and inner housing 9, and passage 14c provided in lower housing 10. This passage 14b is composed of a plurality of small passages which are formed by a plurality of embosses 9a having various figures provided on the outer wall surface of inner housing 9, as shown in FIG. 8 and FIG. 9. Further, passage 14c comprises a plurality of through holes vertically drilled at equal spacing along the inner circumference of lower housing 10, as shown in FIG. 10. These through holes lead to cold air outlet hole 15 provided on slanted surface 15a at the bottom of lower housing and opens to cutting space 34 enclosed with the cooling and dust collecting housing. In this embodiment, slanted surface 15a is shaped at an angle of 45 degrees by a cutting.

Further, dust collecting attachment 16 acting as cutting chip discharging section is connected to intermediate housing 8. Also cutting chip discharging port 16a of dust collecting attachment 16 is connected to through hole 17 for discharging cutting chips which passes through intermediate housing and inner housing at one end and connected to an external cutting chip sucking apparatus of vacuum type (not shown) at the other end.

Figure 13A:
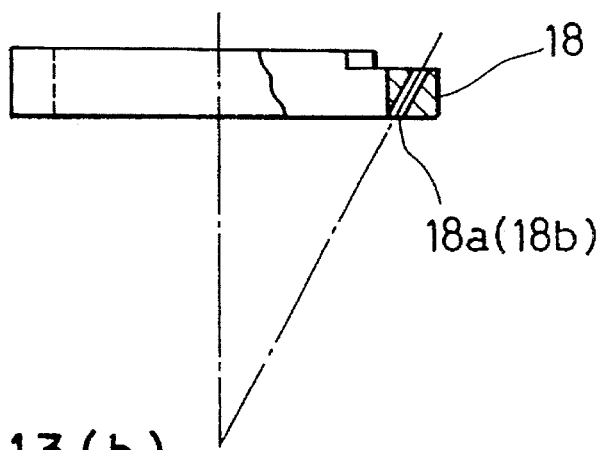
FIG. 13 (a) is a partial sectional view showing a cold air outlet hole for the cutter drilled on a cold air delivery ring.
Figure 13B:
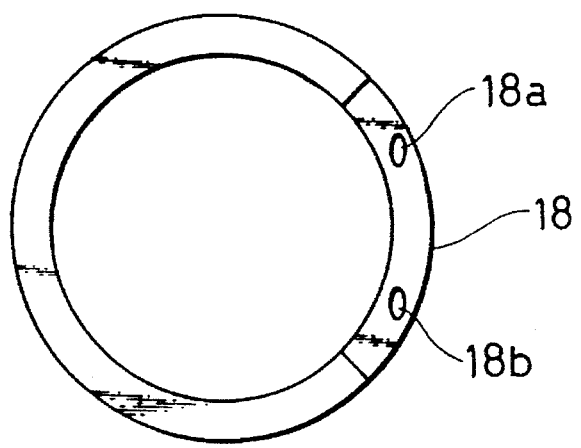

As shown in FIG. 1, cold air delivery ring 18 for cooling a cutter is attached to lower housing 10 and on cold air delivery ring 18 two cold air outlet holes 18a and 18b for cooling a cutter are drilled diagonally at a spacing of angle 20 to 30 degrees, as shown in FIG. 13.

Figure 4:
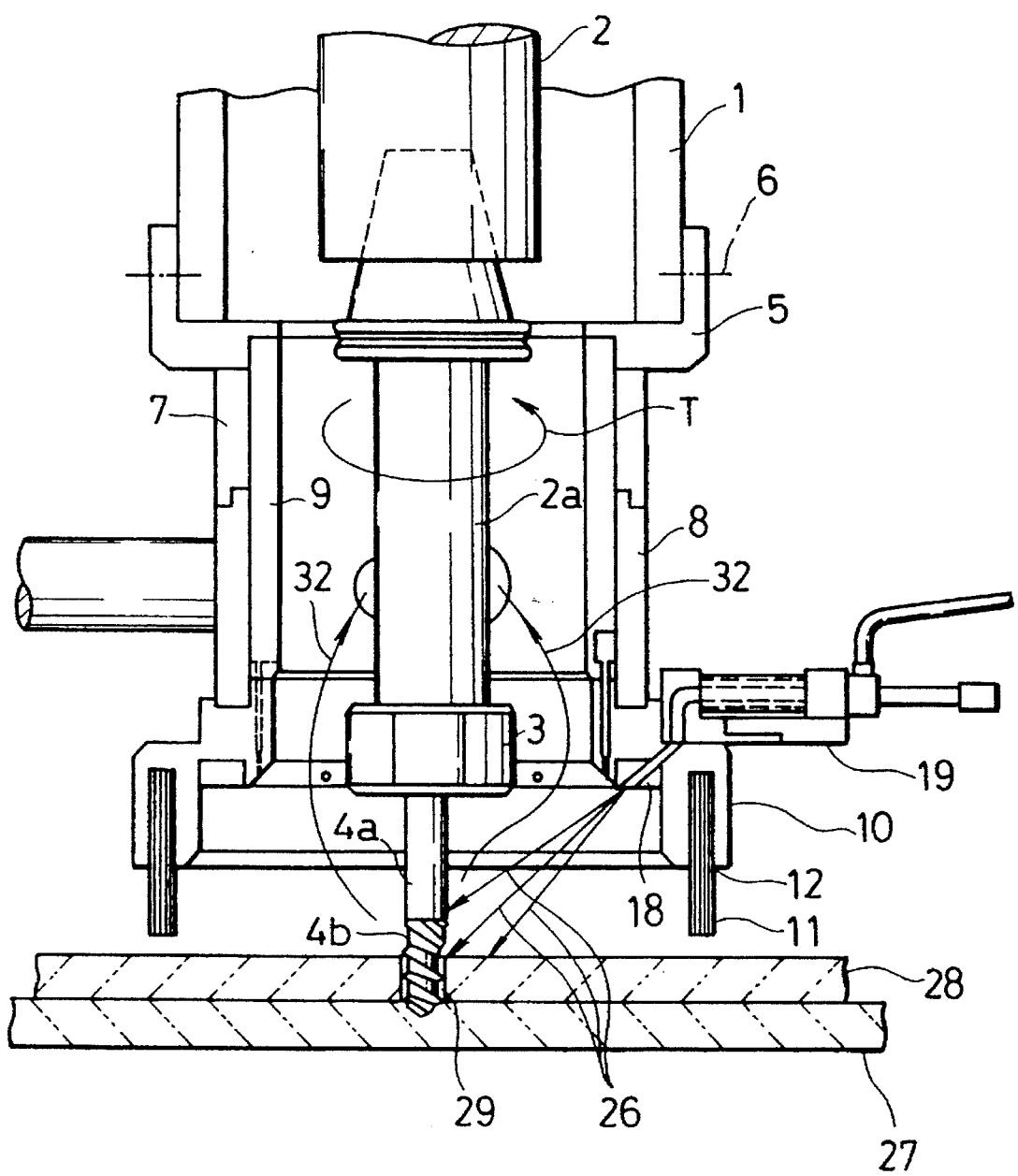
FIG. 4 a sectional view showing the state of the cold air for the cutter blown from the cold air outlet hole according to an embodiment of the present invention.
Figure 5A:
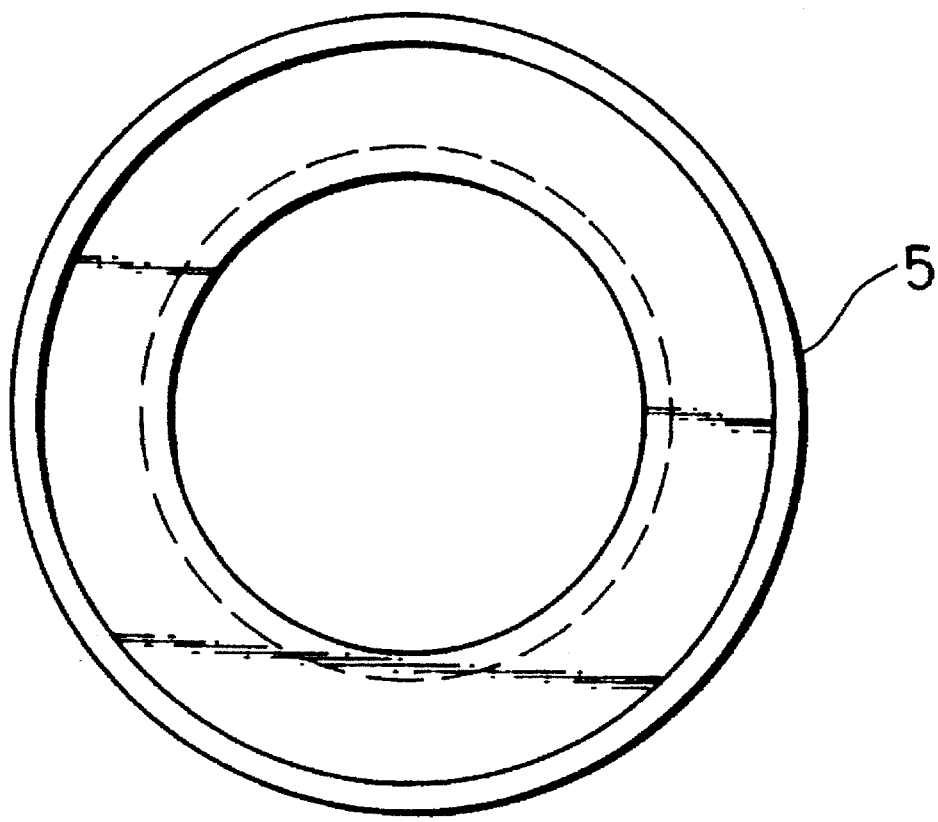
FIG. 5 (a) is a plan view of a mounting member.
Figure 5B:
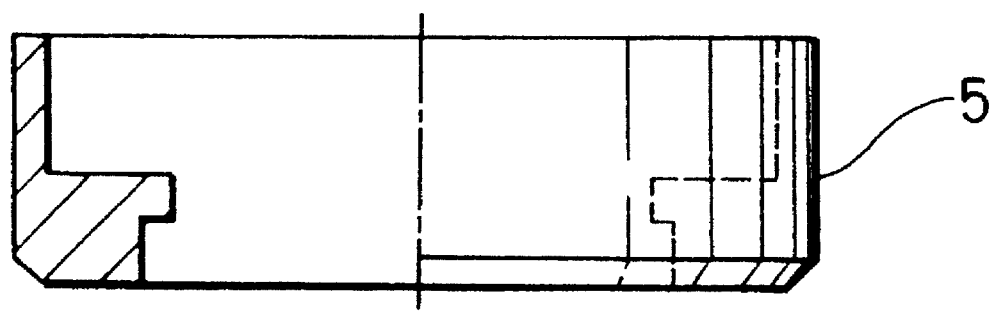
Figure 6A:
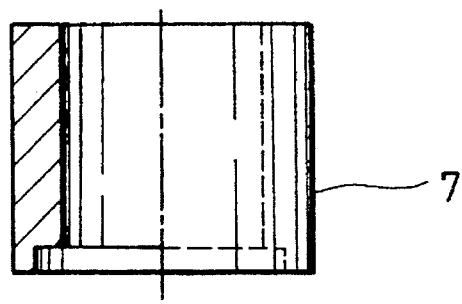
FIG. 6 (a) is a partial sectional view of an upper housing.
Figure 6B:
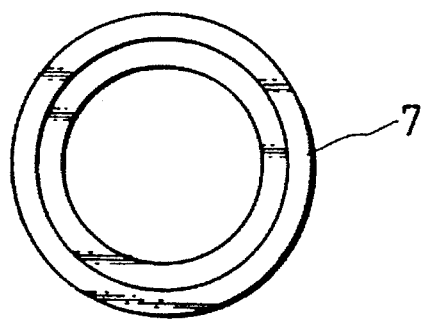
Figure 14:
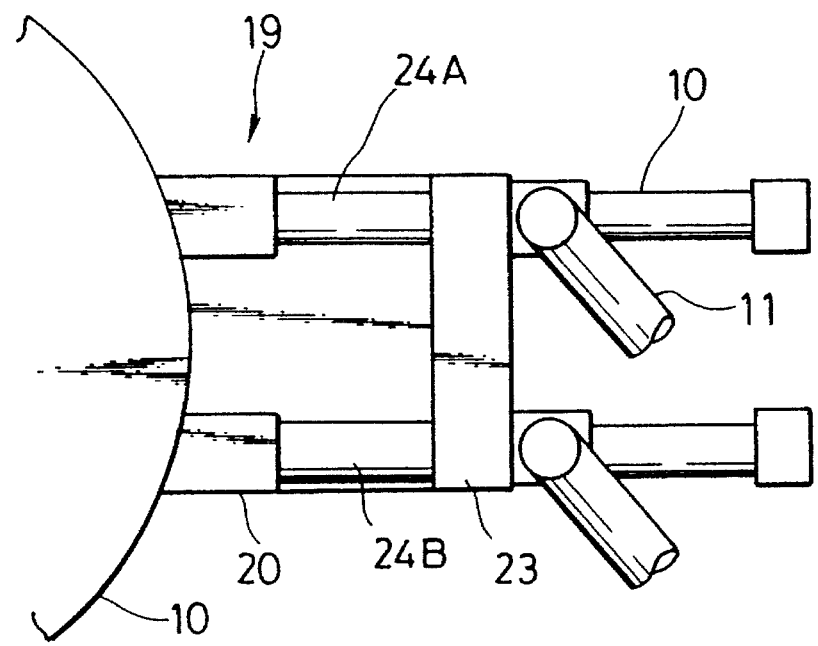
FIG. 14 is a plan view showing an cold air intake attachment for the cutter.

Cold air intake attachment 19 for cooling a cutter is installed on lower housing 10 as shown in FIG. 4 and it comprises cold air distributor 20 fixed to lower housing 10, bracket 21, bracket 22, bracket 23, and a pair of cold air hoses 24A, 24B, as illustrated in enlarged figures in FIG. 14 and FIG. 5. This cold air hose 24A is communicated to cold air outlet hole 18a for cooling a cutter in cold air delivery ring 18 through cold air passage 25A for cooling a cutter at one end thereof and communicated to pressurized cold air supplying apparatus 100 at the other end thereof. Similarly, the cold air hose 24B is communicated to cold air outlet hole 18b for cooling a cutter in cold air delivery ring 18 through cold air passage 25B for cooling a cutter at one end thereof and communicated to pressurized cold air supplying apparatus 100 at the other end thereof.

Thus, the pressurized cold air from pressurized cold air supplying apparatus 100 is blown from cold air outlet holes 18a and 18b through a pair of cold air hoses 24A and 24B and a pair of cold air passages 25A and 25B.

Figure 16A:
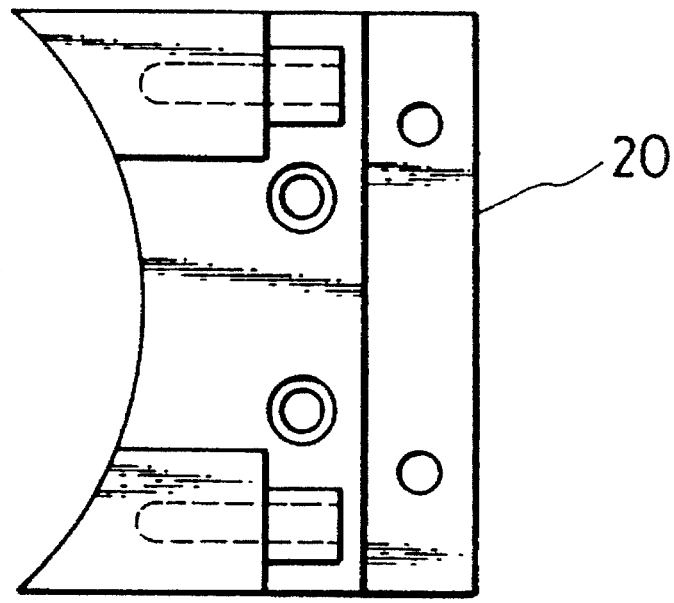
FIG. 16 (a) is a plan view of a cold air distributor for the cutter.
Figure 16B:
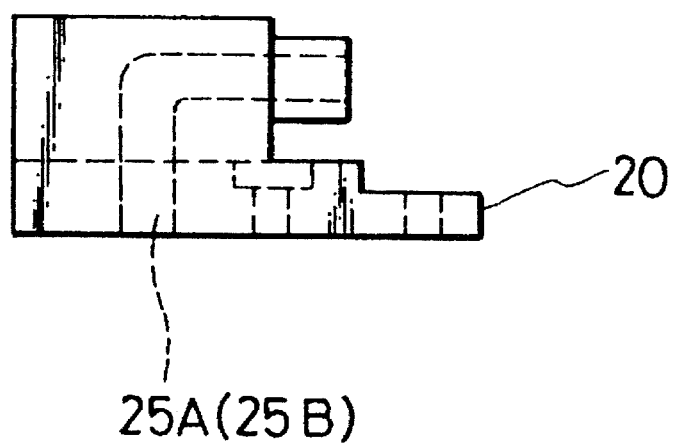
Figure 17A:
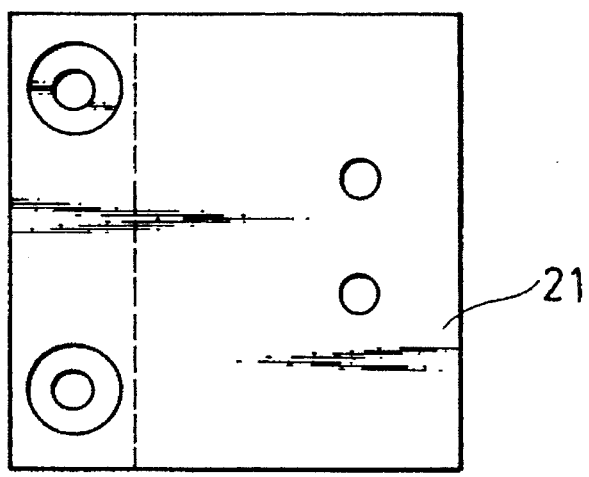
FIG. 17 (a) is a plan view of a bracket constituting a cold air intake attachment for the cutter.
Figure 17B:
Figure 18A:
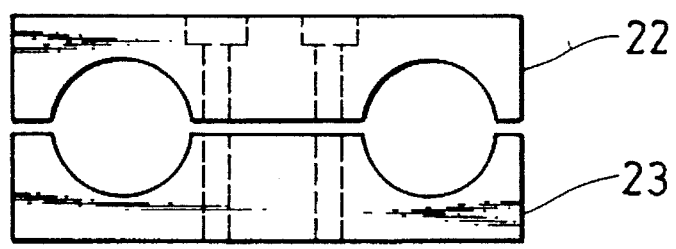
FIG. 18 (a) is a plan view of another bracket constituting a cold air intake attachment for the cutter.
Figure 18B:
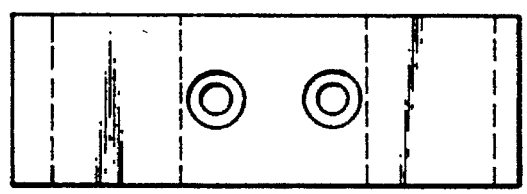

Details are shown in FIG. 16 for cold air distributor 20, in FIG. 17 for bracket 21, in FIG. 18 for bracket 22 and bracket 23.

Figure 19:
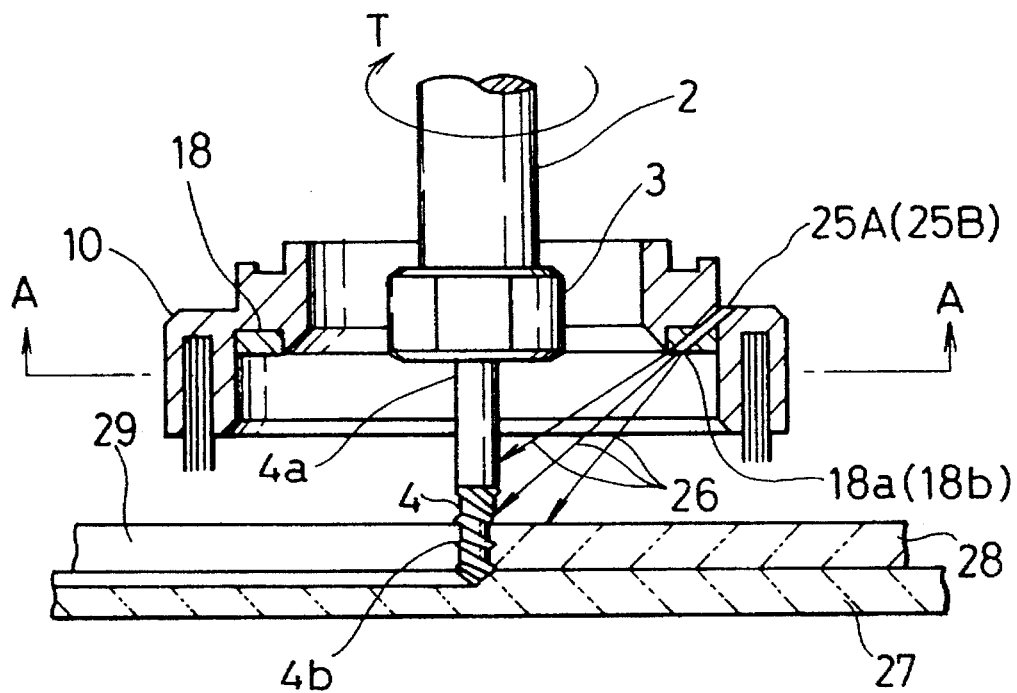
FIG. 19 is a schematic view showing a state of the cold air blown from a cold air delivery ring to a the cutter.
Figure 20:
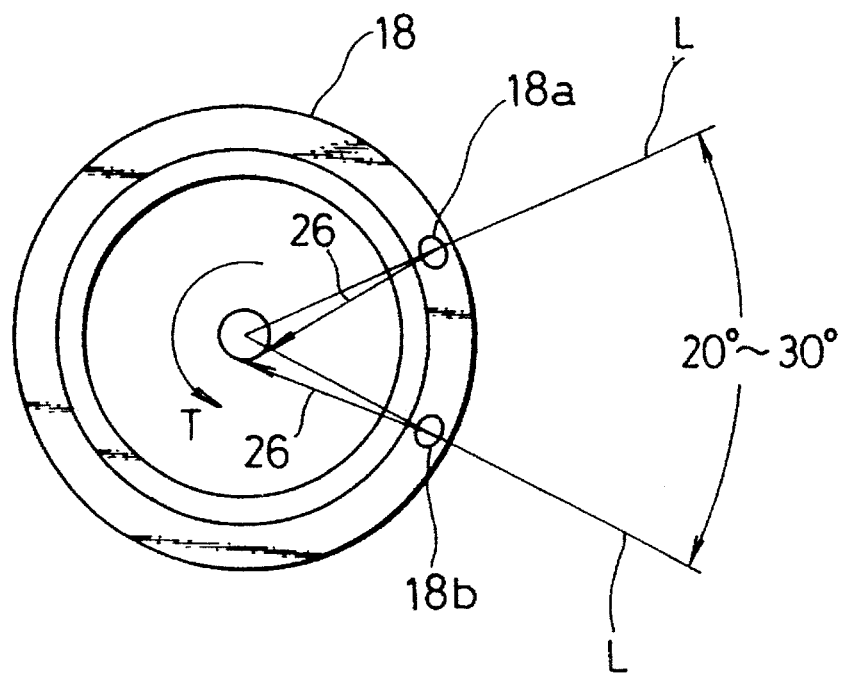
FIG. 20 is an A—A section view of FIG. 19.

FIGS. 19 and 20 show the position of two cold air outlet holes 18a and 18b in cold air delivery ring 18 and the blowing direction of the cold air for cooling cutter from these cold air outlet holes. As mentioned above, two cold air outlet holes 18a and 18b are separated with each other at an angle 20 to 20 degrees. The cold air 26 for cooling cutter blown diagonally downward in the range from the shank portion 4a to the tip of the cutter edge 4b in the opposite direction to the rotation T of the cutter 4 and in the tangent direction of the outer periphery of the cutter edge 4b.

The relationship between cutter 4 and cold air outlet holes 18a and 18b is determined as follows:

As shown in FIG. 20, two cold air outlet holes 18a and 18b are separated at an angle 20 to 30 degrees and each of the cold air outlet hole is drilled in such a way as the cold air is blown to the portion on the cutter shifted as much as a radius of the cutter from the line L connecting the center of the cutter and the center of the cold air outlet hole in an opposite direction to the rotational direction T of the cutter.

Figure 15:
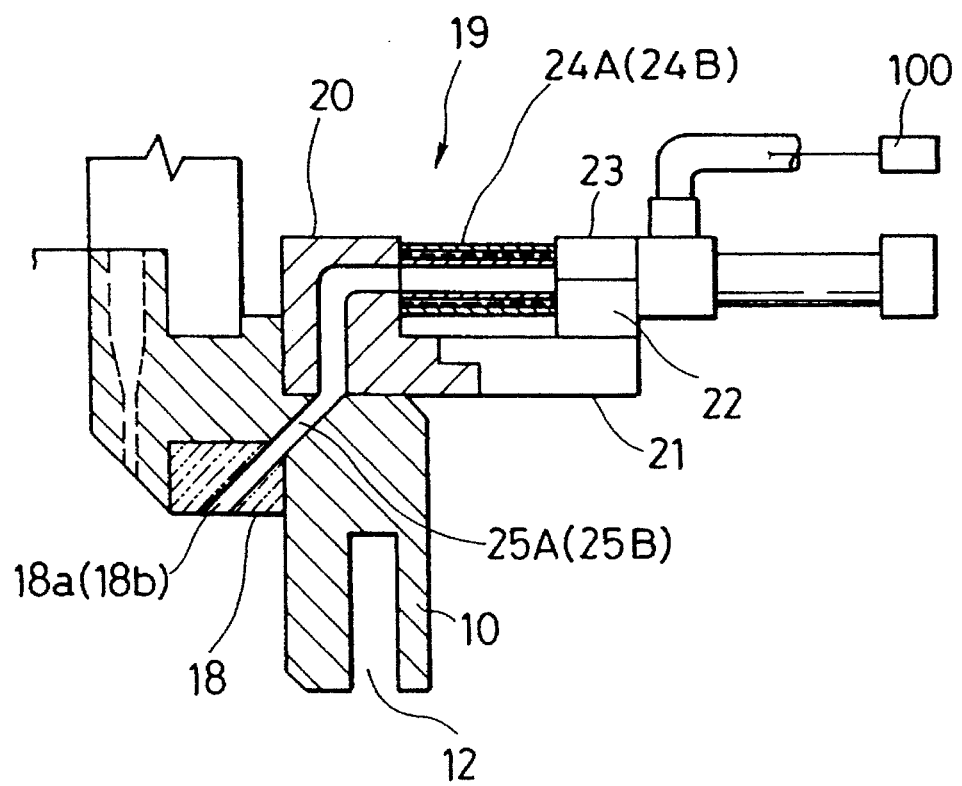
FIG. 15 is a partial sectional view of a cold air intake attachment for the cutter.
Figure 21:
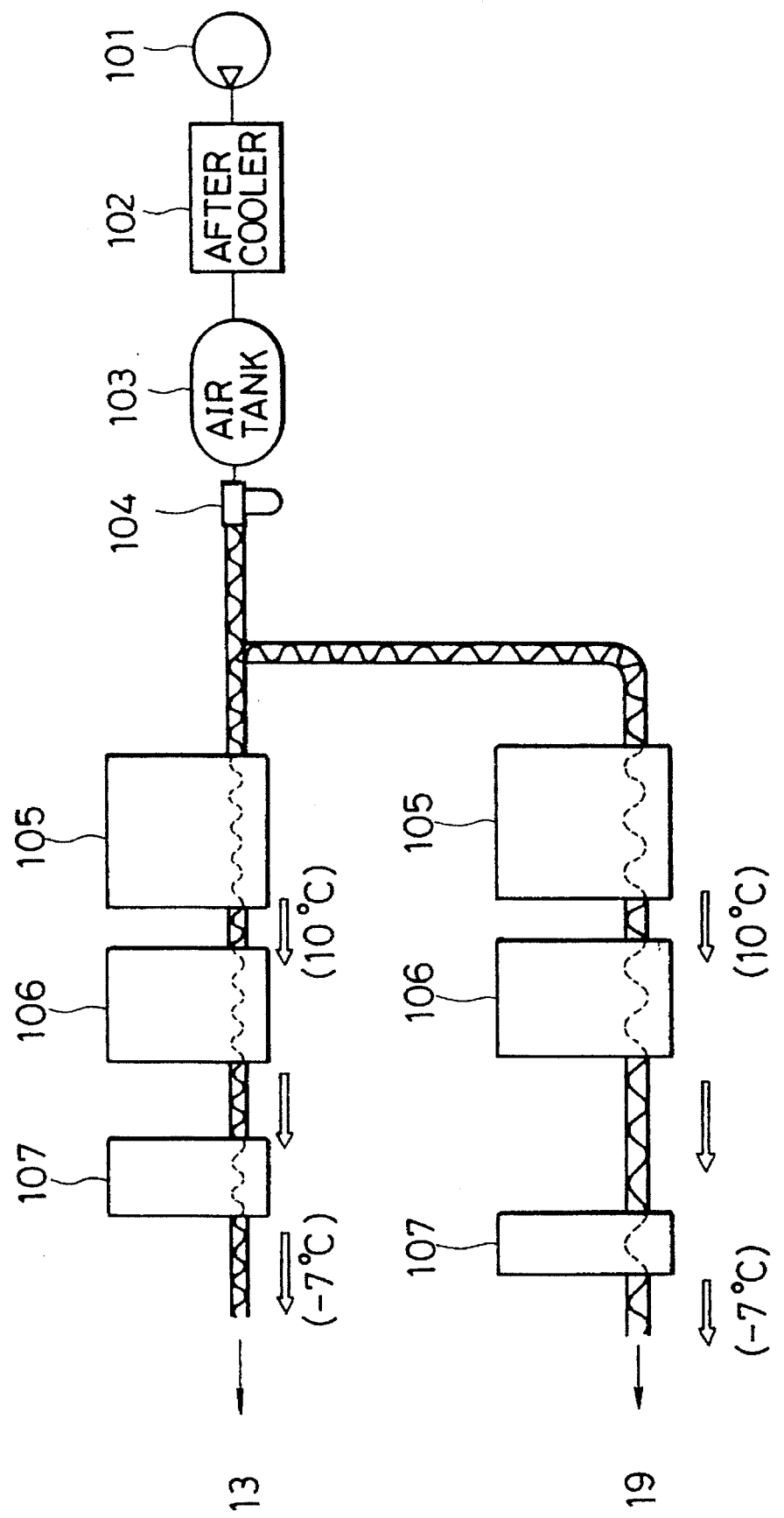
FIG. 21 is a block diagram showing the composition of cold air supplying means for supplying pressurized cold air.

FIG. 21 shows the components of an external pressurized cold air supplying apparatus 100 in FIGS. 12 and 15. First, dust-free factory air with a pressure of 7 kg/cm2 is produced by compressor 101, after-cooler 102, air tank 103 and main filter 104. The factory air is divided into two lines. In each line of the factory air, water is removed by air dryer 105, air is cooled down up to 10 degrees C., oil is removed by regurator/drain 106, then finally the air is cooled up to −7 degrees C. by cooler 107. The pressurized cold air at −7 degree C. thus produced is supplied to cold air intake section 13 for the air curtain and cold air intake section 19 for cooling the cutter through the respective line.

The cooling and dust collecting apparatus constituted above functions as follows:

Referring to FIG. 1, the cutting chip sucking device (not shown) is operated so as to suck the air from inside of the cooling and dust collecting housing by vacuum pressure. In addition, the pressurized cold air is supplied from pressurized cold air supplying apparatus 100 both to cold air intake attachment 13 for the air curtain and cold air intake attachment 19 for cooling the cutter. In this state, cutter 4 cuts workpiece 28 fixed on auxiliary member 27 to make a hole or groove.

Figure 22:
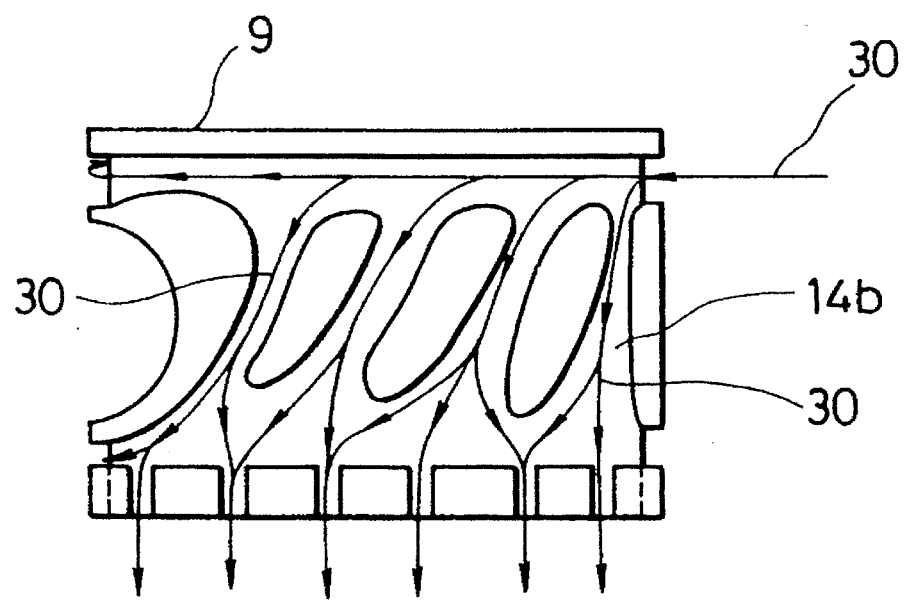
FIG. 22 is an explanatory view showing a state of the cold the air for air curtain which passes through an inside of an inner housing.
Figure 23:
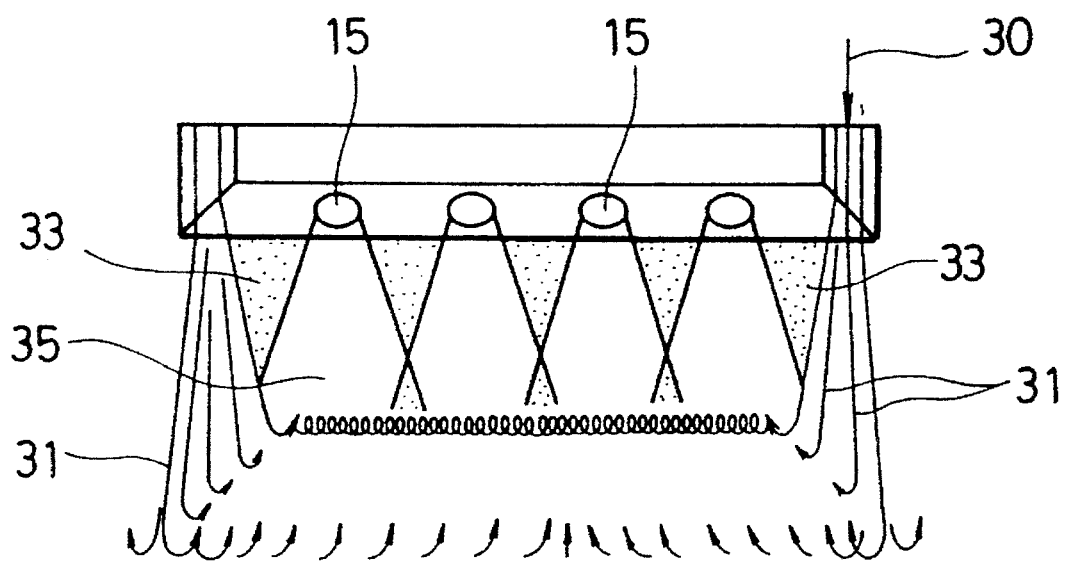
FIG. 23 is an explanatory view showing a state of the cold air for air curtain which has been blown from a cold air outlet hole for air curtain.

Cold air 30 for the air curtain introduced into cold air intake attachment for the air curtain cools the cooling and dust collecting housing, passing through cold air passage 14 for the air curtain in the wall of the cooling and dust collecting housing. After that, the cold air is blown from a plurality of cold air outlet holes 15 for the air curtain which are provided in lower housing 10 so as to form air curtain 31 for shutting the surrounding of the cutter off from outside air. At this moment, the stream of the cold air 30 for the air curtain, as shown in FIG. 22, is diverted into a plurality of flows within inner housing 9, whereby being equalized in pressure. Thus, as shown in FIG. 23, the cold air is blown into cutting space 35 from a plurality of cold air outlet holes 15 for the air curtain with an equal pressure. Since these cold air outlet holes 15 are formed on slanted surface 15a at the bottom of lower housing 10, cold air 30 is blown partly in the right vertical direction and partly in the slightly inside direction (toward the cutter), whereby the shutting-off effect of air curtain 31 becoming more efficient. A slanting angle of slanted surface 15a is determined experimentally at an angle around 45 degrees.

Cold air 26 for cooling the cutter which is introduced to cold air intake attachment 13 for the cutter is blown diagonally and downwardly at an angle of 45 degrees (on the vertical sectional plane) from cold air outlet holes 18a and 18b of cold air delivery ring 18 for the cutter through cold air passages 25A and 25B for the cutter, as illustrated in FIG. 19. Since cold air outlet holes 18a and 18b have an oval shaped opening respectively, the cold air blown from cold air outlet holes 18a and 18b is dispersed vertically. As a result of this, a part of this cold air 26 for the cutter hits the shank portion and cools it so as to prevent the heat transferred from the cutter driving section of the machine tool. The rest of this cold air 26 for the cutter hits edge portion 4b of cutter 4 to cool it and at the same time removes burrs from the hole or groove 29.

As shown in FIG. 19 and FIG. 20, since cold air outlet holes 18a and 18b are separated from each other at an angle of 20 to 30 degrees, cold air from either 18a or 18b hits the hole or groove 29 directly and floats the cutting chips up. Further, since cold air from cold air outlet holes 18a and 18b is blown in the opposite direction to the rotational direction T of cutter 4 and in the tangent direction of the outer periphery of cutter 4, the cutting chips wound around edge portion 4b of cutter 4 are easily peeled off therefrom. These removing operations of cutting chips from edge portion 4b are particularly effectively done, when the cutting has been finished and cutter 4 is detached from workpiece 28, as shown in FIG. 3.

Figure 3:
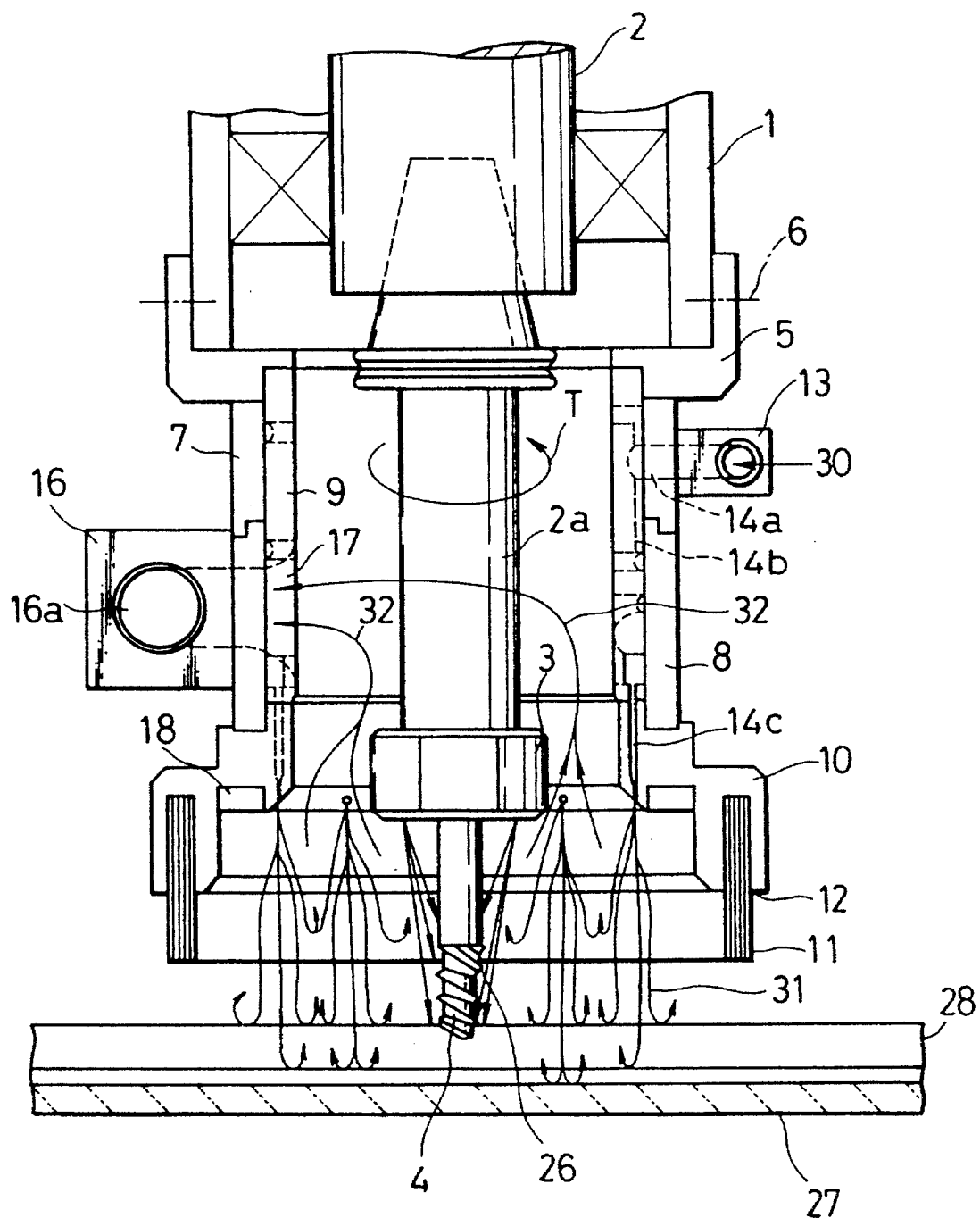
FIG. 3 is a partial sectional view of FIG. 1 showing the state of the apparatus, when a cutting is finished.

Cold air 26 which has cooled both shank portion 4a and edge portion 4b of cutter 4 is sucked and discharged to the external cutting chip sucking device via through hole 17 and cutting chip discharging port 16a, as shown by arrow 32 in FIGS. 1 and 3.

Together with cold air 26, cold air 30 for air curtain is also sucked and discharged to the external cutting 22 chip sucking device via through hole 17 and cutting chip discharging port 16a, after it hits workpiece 28. This sucking and discharging of cold air 30 not only assists the discharging of cutting chips but also cools the inside of the cooling and dust collecting housing.

Thus, the cooling and dust collecting housing itself and cutter 4 inside of the housing are cooled respectively by cold air 30 for the air curtain.

Air curtain 31 and elastic hood 11 act as blocking cooperatively a leak-out of cutting chips. Particularly, elastic hood 11 acts as blocking an inflow of the outside hot air, since there is a possibility that the outside hot air comes toward the center of the cooling and dust collecting housing due to air pockets 33 caused among air curtains 31, as illustrated in FIG. 23.

When a slit 34 is provided at the bottom of lower housing 10 in place of a plurality of cold air outlet holes 15 for air curtain, then elastic hood 11 can be abolished, since abovementioned air pocket 33 is deleted owing to a continuous air curtain made by slit 34.

Further, with respect to the number, the position or the direction of cold air outlet holes 18a and 18b provided in cold air delivery ring these are to be determined depending upon miscellaneous cutting conditions, such as the thickness of the workpiece, the size of the cutting hole or groove. Consequently, it is necessary to choose a cold air delivery ring 18 fitted to the cutting condition from among several cold air delivery rings 18. Even when it is necessary to change the cold air delivery ring 18, only a cold air delivery ring may be replaced with a different one fitted to the cutting condition.

Further, in an embodiment of the present invention mentioned above, cold air 26 for cutter and cold air 30 for the air curtain are supplied from the common pressurized cold air supplying apparatus 100, however it is also possible to supply the cold air from an independent cold air supplying apparatus respectively so as to supply the cold air with a different pressure and a different temperature to the cutter and the air curtain respectively. It is more desirable from the point of cost to supply the cold air with a different pressure and a different temperature from the common cold air supplying device. This will be possible by using orifices or chambers within the cold air passages.

Further, the pressure and the temperature of cold air 26 for the cutter or cold air 30 for air curtain are determined in accordance with the cutting condition. Especially with the temperature of cold air 26 for the cutter, it is preferable to be between 5 to −15 degrees C. Particularly, it is known that the temperatures of lower than 5 degrees C. have an effect of extending the life of the cutter 6 times longer than at room temperature. With respect to cold air 30 for the air curtain, the temperature can be chosen from a broader range than the one for cold air 26. In some cases, room temperature may be allowed for cold air 30.

Also it is known that coating adhesive on the mating surfaces of the elements composing the cooling and dust collecting housing is helpful for insulating the inside of component members 5, 7, 8, 9 and 10 from heat.

Further, with respect to the material of the workpiece, any materials, namely, metals, composite materials, woods and stones can be used.

In summary, according to the present invention, since the cold air for the cutter is blown from the cold air outlet holes for the cutter in the diagonally downward direction and in the tangent direction of the outer periphery of the the cutter, not only the portion of cutter exposed outside but also the portion hidden in the workpiece can be cooled and cutting chips can be removed easily therefrom.

Further, since the cold air for the air curtain is blown downward from the cold air outlet holes for the air curtain to form the air curtain, the surroundings of the cutter is shut off from the outside air, whereby the cutter can be efficiently cooled. Also the cold air for the air curtain helps to discharge cutting chips out of the cutting chip discharging port after the air curtain being formed.

Further, since the cold air passages are provided in the cooling and dust collecting housing, the housing itself can be cooled when the cold air passes through these passages, whereby the cooling of the cutter being promoted.

The cutter which is satisfactorily cooled has so small a wear that the cutter life can be extended substantially. On the other hand, since the extended life of the cutter will produce small sizes of cutting chips on an average, cutting chips can be discharged more easily.

While the presently preferred embodiment of the present invention has been shown and described, it is to be understood that this disclosure is for the purpose of illustration and that various changes and modifications may be made without departing from the scope of the invention as set forth in the appended claims.

I claim:

1. A cooling and dust collecting apparatus for a machine tool for cooling a cutter and for sucking and discharging cutting chips to the outside of said apparatus, said apparatus comprising:

a housing fixed to said machine tool for enclosing a spindle and a cutter of said machine tool;

an elastic hood suspended from the bottom end of said housing for ensuring an enclosure of said housing;

cold air supplying means for supplying pressurized cold air;

a first cold air intake attachment mounted on said housing for introducing said pressurized cold air from said cold air supplying means into said housing;

a second cold air intake attachment mounted on said housing for introducing said pressurized cold air from said cold air supplying means into said housing;

a plurality of first cold air outlet holes provided at equal spaces on a bottom surface of said housing so as to form an air curtain around said cutter with said pressurized cold air blown vertically from said first cold air outlet holes;

a plurality of second cold air outlet holes provided in a ring attachment detachably connected to the bottom of said housing so as to cool said cutter with said pressurized cold air blown diagonally and downwardly from said second cold air outlet holes;

first cold air passage means provided in said housing for communicating said first cold air intake attachment and said first cold air outlet holes;

second cold air passage means provided in said housing for communicating said second cold air intake attachment and said ring attachment;

a cold air discharging attachment mounted on said housing for discharging cutting chips from inside of said housing together with said pressurized cold air; and cutting chip sucking means communicated to said cold air discharging attachment for sucking and collecting cutting chips.

2. A cooling and dust collecting apparatus for a machine tool for cooling a cutter and for sucking and discharging cutting chips to the outside of said apparatus, said apparatus comprising:

a housing fixed to said machine tool for enclosing a spindle and a cutter of said machine tool;

cold air supplying means for supplying a pressurized cold air;

a first cold air intake attachment mounted on said housing for introducing said pressurized cold air from said cold air supplying means into said housing;

a second cold air intake attachment mounted on said housing for introducing said pressurized cold air from said cold air supplying means into said housing;

a slit circularly provided on a bottom surface of said housing so as to form an air curtain surrounding said cutter with said pressurized cold air blown vertically from said slit;

a plurality of cold air outlet holes provided in a ring attachment detachably connected to the bottom of said housing so as to cool said cutter with said pressurized cold air blown diagonally and downwardly from said cold air outlet holes;

first cold air passage means provided in said housing for communicating said first cold air intake attachment and said slit;

second cold air passage means provided in said housing for communicating said second cold air intake attachment and said ring attachment;

a cold air discharging attachment mounted on said housing for discharging cutting chips from inside of said housing together with said pressurized cold air; and cutting chip sucking means communicated to said cold air discharging attachment for sucking and collecting cutting chips.

3. A cooling and dust collecting apparatus for a machine tool for cooling a cutter and for sucking and discharging cutting chips to the outside of said apparatus, said apparatus comprising:

a housing fixed to said machine tool for enclosing a spindle and a cutter of said machine tool;

an elastic hood suspended from a bottom end of said housing for ensuring an enclosure of said housing;

first cold air supplying means for supplying first pressurized cold air;

second cold air supplying means for supplying second pressurized cold air;

a first cold air intake attachment mounted on said housing for introducing said first pressurized cold air from said first cold air supplying means into said housing;

a second cold air intake attachment mounted on said housing for introducing said second pressurized cold air from said second cold air supplying means into said housing;

a plurality of first cold air outlet holes provided at equal spaces on the bottom surface of said housing so as to form an air curtain around said cutter with said first pressurized cold air blown vertically from said first cold air outlet holes;

a plurality of second cold air outlet holes provided in a ring attachment detachably connected to the bottom of said housing so as to cool said cutter with said second pressurized cold air blown diagonally and downwardly from said second cold air outlet holes;

first cold air passage means provided in said housing for communicating said first cold air intake attachment and said first cold air outlet holes;

second cold air passage means provided in said housing for communicating said second cold air intake attachment and said ring attachment;

a cold air discharging attachment mounted on said housing for discharging cutting chips from inside of said housing together with said first and second pressurized cold air;

cutting chip sucking means communicated to said cold air discharging attachment for sucking and collecting cutting chips.

4. A cooling and dust collecting apparatus for a machine tool for cooling a cutter and for sucking and discharging cutting chips to the outside of said apparatus, said apparatus comprising:

a housing fixed to said machine tool for enclosing a spindle and a cutter of said machine tool;

first cold air supplying means for supplying a first pressurized cold air;

second cold air supplying means for supplying a second pressurized cold air;

a first cold air intake attachment mounted on said housing for introducing said first pressurized cold air from said first cold air supplying means into said housing;

a second cold air intake attachment mounted on said housing for introducing said second pressurized cold air from said second cold air supplying means into said housing;

a slit circularly provided on a bottom surface of said housing so as to form an air curtain surrounding said cutter with said first pressurized cold air blown vertically from said slit;

a plurality of cold air outlet holes provided in a ring attachment detachably connected to the bottom of said housing so as to cool said cutter with said second pressurized cold air blown diagonally and downwardly from said cold air outlet holes;

first cold air passage means provided in said housing for communicating said first cold air intake attachment and said slit;

second cold air passage means provided in said housing for communicating said second cold air intake attachment and said ring attachment;

cold air discharging attachment mounted on said housing for discharging cutting chips from inside of said housing together with said first and second pressurized cold air; and cutting chip sucking means communicated to said cold air discharging attachment for sucking and collecting cutting chips.

5. The apparatus according to claim 1, wherein said bottom surface toward the center line of said housing in the diagonally downward direction.

6. The apparatus according to claim 2, wherein said bottom surface faces toward the center line of said housing in the diagonally downward direction.

7. The apparatus according to claim 3, wherein said bottom surface faces toward the center line of said housing in the diagonally downward direction.

8. The apparatus according to claim 4, wherein said bottom surface faces toward the center line of said housing in the diagonally downward direction.

9. The apparatus according to claim 1, wherein said second cold air outlet holes are provided in said cold air delivery ring at two positions with an angular spacing ranging from 20 to 30 degrees and for each of said second cold air outlet holes, a center line of said second cold air outlet hole is directed to an opposite direction to a rotational direction of said cutter and an extension of said center line abuts an outer periphery of said cutter.

10. The apparatus according to claim 2 wherein said second cold air outlet holes are provided in said cold air delivery ring at two positions with an angular spacing ranging from 20 to 30 degrees and for each of said second cold air outlet holes, a center line of said second cold air outlet hole is directed to an opposite direction to a rotational direction of said cutter and an extension of said center line abuts an outer periphery of said cutter.

11. The apparatus according to claim 3, wherein
said second cold air outlet holes are provided in said second cold air delivery ring at two positions with an angular spacing ranging from 20 to 30 degrees and for each of said second cold air outlet holes, a center line of said second cold air outlet hole is directed to an opposite direction to a rotational direction of said cutter and an extension of said center Line abuts an outer periphery of said cutter.

12. The apparatus according to claim 4, wherein
said second cold air outlet holes are provided in said cold air delivery ring at two positions with an angular spacing ranging from 20 to 30 degrees and for each of said second cold air outlet holes, a center line of said second cold air outlet hole is directed to an opposite direction to a rotational direction of said cutter and an extension of said center line abuts an outer periphery of said cutter, when said cold air delivery ring is viewed from above.

13. The apparatus according to claim 1, wherein
said second cold air outlet holes are provided in said cold air delivery ring so as to direct a center line of said second cold air outlet hole in the diagonally downward direction when said cold air delivery ring is viewed from side, and so as to have an oval shape when said cold air delivery ring is viewed from the bottom.

14. The apparatus according to claim 2, wherein
said second cold air outlet holes are provided in said cold air delivery ring so as to direct a center line of said second cold air outlet hole in the diagonally downward direction when said cold air delivery ring is viewed from side, and so as to have an oval shape when said cold air delivery ring is viewed from the bottom.

15. The apparatus according to claim 3, wherein
said second cold air outlet holes are provided in said cold air delivery ring so as to direct a center line of said second cold air outlet hole in the diagonally downward direction when said cold air delivery ring is viewed from side, and so as to have an oval shape when said cold air delivery ring is viewed from the bottom.

16. The apparatus according to claim 4, wherein
said second cold air outlet holes are provided in said cold air delivery ring so as to direct a center line of said second cold air outlet hole in the diagonally downward direction when said cold air delivery ring is viewed from side, and so as to have an oval shape when said cold air delivery ring is viewed from the bottom.

17. The apparatus according to claim 1, wherein
said ring attachment can be replaced with another ring attachment having a plurality of second cold air outlet holes provided in a different way.

18. The apparatus according to claim 2, wherein
said ring attachment can be replaced with another ring attachment having a plurality of second cold air outlet holes provided in a different way.

19. The apparatus according to claim 3, wherein
said ring attachment can be replaced with another ring attachment having a plurality of second cold air outlet holes provided in a different way.

20. The apparatus according to claim 4, wherein
said ring attachment can be replaced with another ring attachment having a plurality of second cold air outlet holes provided in a different way.

* * * * *